INVENTOR.
RALPH H. LEBOW

INVENTOR.
RALPH H. LEBOW
BY
Oberlin, Maky & Donnelly
ATTORNEYS

United States Patent Office 3,335,746
Patented Aug. 15, 1967

3,335,746
FLUID PRESSURE CONTROL DEVICE
Ralph H. Lebow, Pacific Palisades, Calif., assignor to Parker-Hannifin Corporation, Cleveland, Ohio, a corporation of Ohio
Filed Aug. 12, 1964, Ser. No. 389,075
8 Claims. (Cl. 137—389)

The present invention relates generally as indicated to a fluid pressure control device and more particularly to such control device which in the case of a fluid delivery system is effective to either discontinue the withdrawal of fluid from a supply tank, or to return the fluid to the tank when the level of the fluid in the tank reaches a predetermined minimum level. In this way pump cavitation is prevented.

It is a principal object of this invention to provide a fluid pressure control device of the character indicated which is of simple, low-cost construction and which discontinues the delivery of fluid from the tank when the level of fluid in the tank reaches a predetermined minimum level.

It is another object of this invention to provide a fluid presure control device of the character indicated which is effective to return most, if not all, of the fluid to the supply tank after the level of the fluid in the tank has reached a predetermined minimum level thereby preventing pump cavitation.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing set forth in detail certain illustrative embodiments of the invention, these being indicative, however, of a few of the various ways in which the principle of the invention may be employed.

Figure 1:
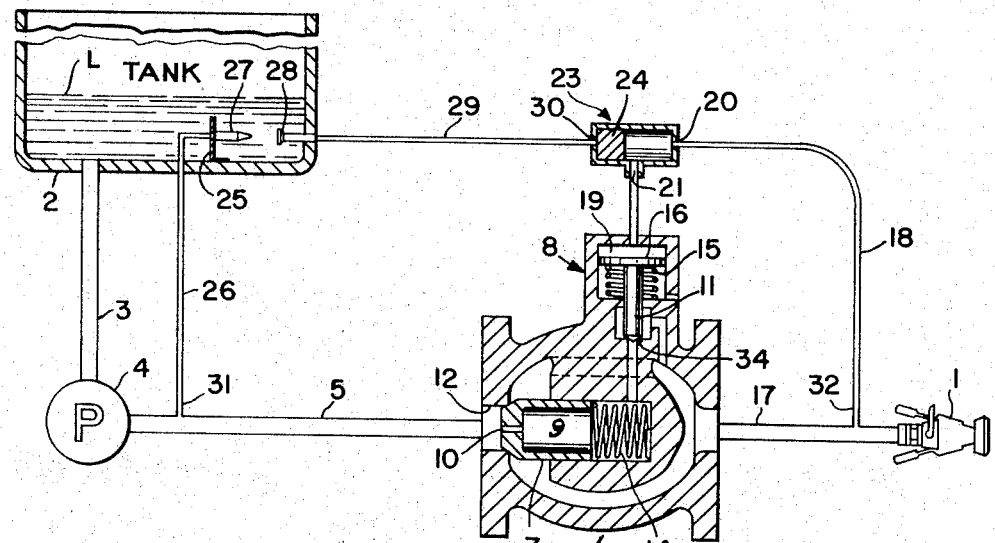
Figure 2:
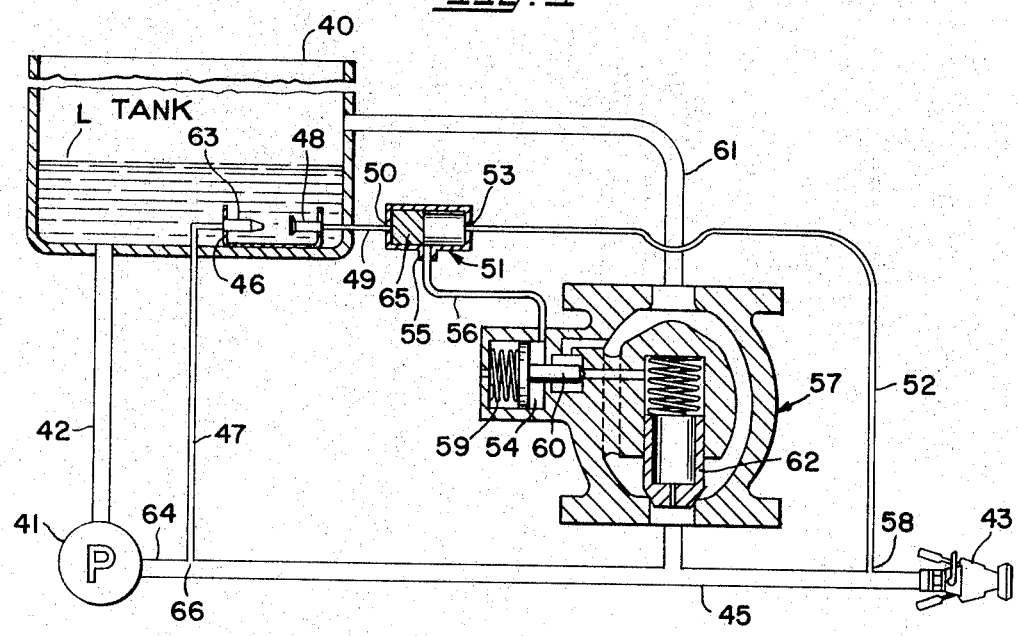
Figure 3:
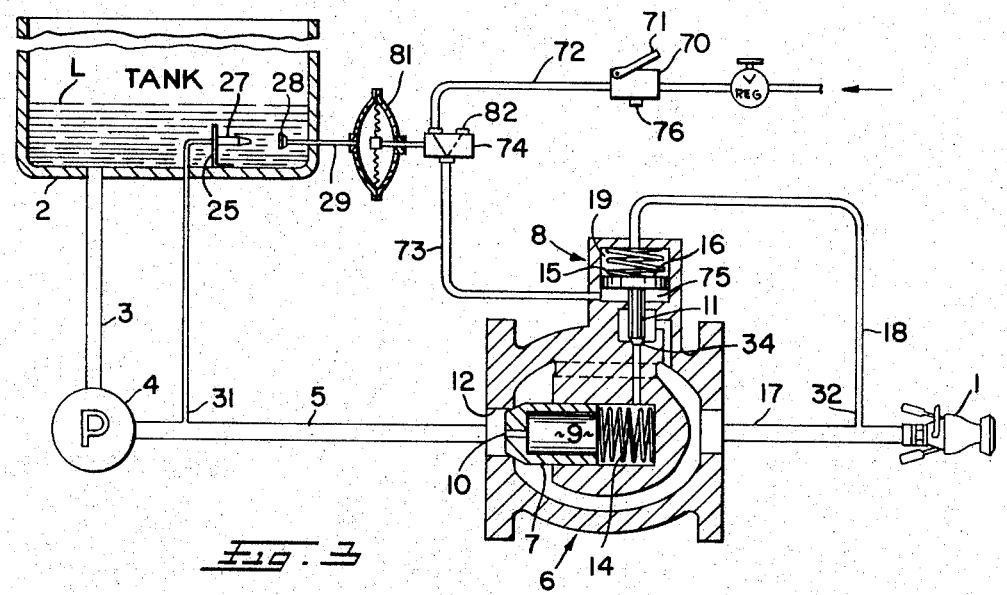
Figure 4:
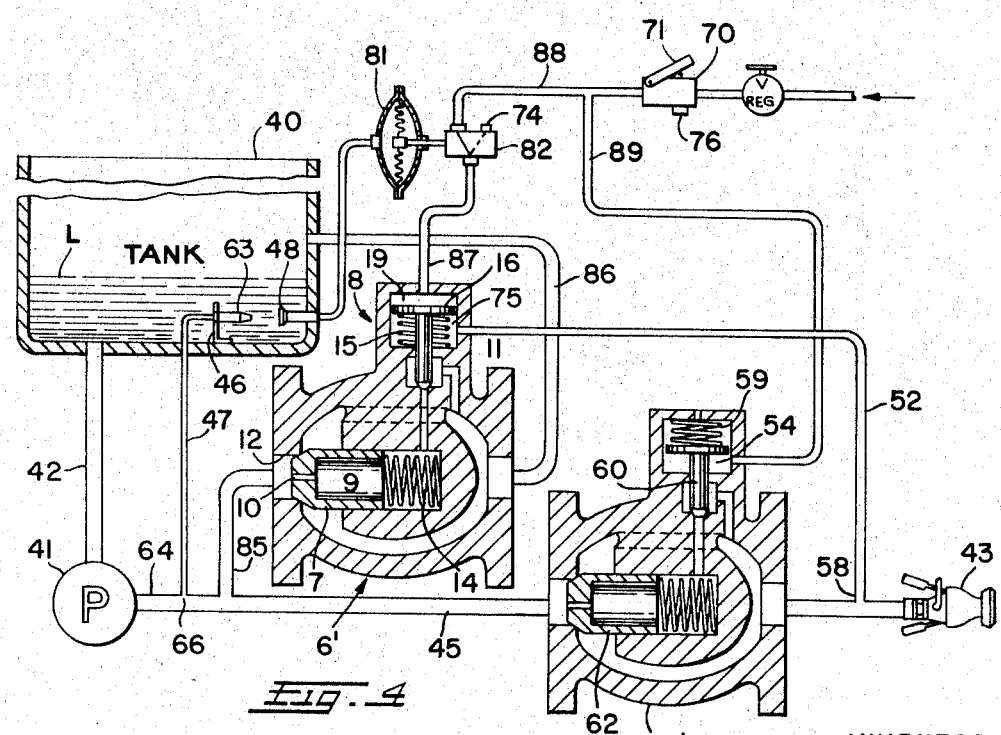

In said annexed drawing:

FIG. 1 is a schematic piping diagram illustrating one form of the present fluid pressure control device in which the pump outlet pressure control valve through which the fluid is supplied to a point of use is of the demand type;

FIG. 2 is a schematic piping diagram of another form of fluid pressure control device in which the pump outlet pressure control valve is of the bypass type which regulates the pressure in the pump discharge conduit by bypassing a portion of the pump discharge back to the supply tank; and FIGS. 3 and 4 are schematic piping diagrams of yet other forms of fluid pressure control devices embodying the present invention.

Referring first to FIG. 1, the same schematically depicts a fuel supply system which terminates in a fuel delivery nozzle 1 adapted to have a detachable connection with a mating part built into the fuel tank as of an airplane, or the tank of a fuel truck or the like. The reference numeral 2 denotes the fuel supply tank to which the intake conduit 3 of the pump 4 is connected and the pump 4 has an outlet or discharge conduit 5 leading to the nozzle via demand type pressure controller 6. The pressure controller 6 is of the pilot operated type in which the amount of opening of the main valve 7 is controlled by the position of the pressure actuated pilot valve 8 which variably vents the pressure chamber 9 behind the main valve 7 in relation to the flow capacity of the main valve orifice 10. Thus, when the pilot valve 11 is seated, the fluid pressure in the chamber 9 acts on a larger area of the main valve 7 than the fluid pressure in the inlet port 12 and, therefore, said pressure together with the spring pressure 14 holds the main valve member 7 in closed position.

The pilot valve 11 is biased by spring 15 towards open position and the amount of movement of the pilot valve 11 depends on the magnitude of fluid pressure acting on the plunger portion 16 thereof, the pressure in this case being that in the downstream portion of the delivery conduit 17, there being a branch conduit 18 leading from the delivery conduit 17 to the chamber 19 of the pilot valve plunger portion 16 via the ports 20 and 21 of a shuttle valve 23 which are shown in fluid communication when the valve shuttle 24 is in the left position as shown. Leading from an upstream portion 5 of the delivery conduit to a jet level sensor 25 in the tank 2 is a branch conduit 26 which terminates in a jet nozzle 27 which is aligned with and spaced from a jet receiver 28 which by way of the conduit 29 leads to the port 30 of the shuttle valve 23. The jet level sensor 25 illustrated herein may be of the type disclosed in the Davies Pat. No. 3,020,924, dated Feb. 13, 1962, in which the velocity head of a jet stream issuing from nozzle 27 is converted by the receiver 28 to a pressure head.

If desired, the jet level sensor 25 may be mounted exteriorly of tank 2 in a separate housing having fluid communication with the tank and positioned relative thereto for causing the jet to become operative at the desired level of liquid within the tank. It can be seen from FIG. 1 that so long as the level L of the liquid is above the jet nozzle 27 and receiver 28, there will be no jet and the energy will be dissipated in the liquid whereby the pressure in the receiver 28 and in the receiver conduit 29 leading to the shuttle valve port 30 will be approximately equal to the head of liquid above the receiver 28.

Thus, in normal operation, pilot valve 11 is initially held open by spring 15 to permit discharged pressure of pump 4 in conduit 5 to open valve element 7 whereby liquid is delivered to nozzle 1. The pressure at point 32 is normally less than at point 31 because of the pressure drop across valve 6 and along conduits 5 and 17. While the pressure at point 32 is below a predetermined value, the pressure in chamber 19 remains insufficient to overcome spring 15 and valve 11 continues to move in an opening direction for relieving pressure from chamber 9 faster than it can build up through orifice 10. This causes valve 7 to likewise continue to move in an opening direction for increasing flow through valve 6 until the pressure at point 32 reaches the predetermined value. At that time valves 11 and 7 will be in position for maintaining the predetermined pressure at 32.

When the pressure at 32 for any reason exceeds the predetermined value, the correspondingly higher pressure in chamber 19 causes movement of valve 11, and hence of valve 7, in closing directions until the pressure at 32 is reduced to the predetermined value.

However, when the level L of the liquid drops below the jet nozzle 27, the jet stream will impinge on the receiver 28 and this high pressure in the receiver conduit 29 will act on the shuttle valve 24 to move it to the right and this high pressure will then move the pilot valve member 11 into or substantially into engagement with its seat so that the rate of delivery of the liquid will either stop or be cut down to such a low value that the attendant will be apprised of the fact that the level of liquid in the tank 2 is approaching that which would uncover the pump 4 inlet and cause cavitation of the pump. If, or course, the main valve 7 is completely closed, there may be provided a relief valve (not shown) between the pump 4 and the pressure controller 6 with a return line to tank 2 to prevent dead heading of the pump discharge line.

Referring now to FIG. 2, there again is provided a liquid supply tank 40, a pump 41 having its intake port connected to the tank by means of the intake conduit 42, a delivery nozzle 43 connected at the end of the delivery or discharge line 45 from the pump 41, and a jet level sensor 46 in the tank 40 connected by conduit 47 to the upstream end of the delivery line 45 with a receiver 48 and receiver conduit 49 connected to the port 50 of a shuttle valve 51, a downstream lower pressure branch conduit 52 connected to the opposite port 53 of the shuttle valve 51, with pressure being directed to the pilot valve chamber 54 via the conduit 56 connected to the third port 55 of the shuttle valve.

In this case the regulator valve 57 is of the bypass type in which fluid pressure at, or adjacent the nozzle 43, is controlled by increasing or decreasing the amount of liquid which is returned back to the tank 40 via the bypass regulator valve 57.

When the pressure of liquid at point 58 is below a predetermined value, the corresponding pressure in chamber 54 is insufficient to overcome spring 59 and hence pilot valve member 60 and valve member 62 move toward their closed positions, thus decreasing the bypass flow of liquid from conduit 45 through valve 57 to tank 40 via conduit 61 with a resultant increase of flow through conduit 45 to nozzle 43. In the event the pressure at point 58 exceeds the predetermined value, the corresponding high pressure in chamber 54 causes valve 60, and hence valve 62, to move in an opening direction to increase the bypass flow from conduit 45 to tank 40 and decrease the flow through conduit 45 to nozzle 43.

When the level L of the liquid drops below the level of the jet nozzle 63, the jet stream at the higher pressure of the upstream portion 66 of delivery conduit 45 adjacent the pump discharge port 64 will impinge on the jet receiver 48 and transmit this higher pressure through the receiver conduit 49 to cause the shuttle valve member 65 to shift to the right whereby such high pressure enters chamber 54 and moves the pilot valve member 60 to its full open position to permit full opening of the main valve 62 so as to bypass the fluid back into the tank 40 and thus prevent complete emptying of the tank 40 with consequent pump cavitation.

Referring now to FIG. 3, the system therein disclosed is similar to FIG. 1 except that the pilot valve 11 is opened to air pressure by operation of a three-way valve 70 which preferably is of the so-called "deadman type" which requires the operator to hold the operating lever 71 in actuated position to conduct air under pressure through conduit 72–73 via three-way valve 74 into the chamber 75 beneath the plunger 16 of the pilot valve 11.

Also, in this instance, pilot valve 11 is normally urged toward its closed position by spring 15, rather than toward open position. When the operator releases the lever 71, air supply is shut off by valve 70 and the chamber 75 is vented through port 76 of valve 70, whereby spring 15 and fuel pressure in the sensing line 18 acting in chamber 19 on the upper side of the plunger 16 will close the pilot valve 11 to thus effect closing of the main valve 7.

As previously described, in normal operation of FIG. 3 with valve 70 held open, the pilot valve 11 is initially held open by air pressure in chamber 75 against spring 15 to permit discharge of pump 4 in conduit 5 to open valve element 7 whereby liquid is delivered to nozzle 1. The pressure at point 32 is normally less than at point 31 because of the pressure drop across valve 6 and along conduits 5 and 17. When the pressure at 32 is below a predetermined value, the pressure in chamber 19 plus the pressure of spring 5 is insufficient to overcome air pressure in chamber 75 and thus valve 11 moves in an opening direction for relieving chamber 9 faster than it can build up through orifice 10 whereby valve 7 moves in an opening direction for increased flow through valve 6 until pressure at 32 reaches the predetermined valve. However, if the pressure at 32 exceeds such predetermined value, the higher pressure in chamber 19 will move valve 11, and hence valve 7, in closing direction to decrease flow through valve 6.

In the air line 72–73 is the above-referred to three-way valve 74. Valve 74 is normally spring pressed to a position for connecting line 72 with line 73 and for blocking vent port 82. Actuator 81 of valve 74 is communicated with the conduit 29 of the receiver 28 of the jet level sensor 25. Accordingly, when the liquid level L is below the jet nozzle 27, the pressure in the actuator 81 will increase to a value sufficient to actuate the three-way valve 74 to a position blocking conduit 72 and venting the pilot valve chamber 75 through conduit 73 and port 82 for effecting closing of the main valve 7 in the same manner as when the deadman valve 70 vents chamber 75 through port 76.

The system shown in FIG. 4 has, as in FIG. 3, provision for air pressure actuation of the pilot valves 11 and 60 of valves 6' and 57' (corresponding in structure with valves 6 and 57 of FIGS. 1 and 2) upon operation of the three-way deadman valve, and as evident, when the pilot valve 60 is unseated, the main valve member 62 is moved to permit discharge of fuel by the pump 41 through the delivery nozzle 43.

When the three-way deadman valve 70 is operated as aforesaid, air pressure also flows through the normally open three-way valve 74 into chamber 19 tending to effect closing or partial closing of the pilot valve 11 for the valve member 7 according to the magnitude of fuel pressure in chamber 75 and fuel sensing conduit 52. If the pressure at point 58 is higher than a predetermined value the pilot valve 11, and hence valve 7, will open a greater amount for greater bypass to tank 40 via conduit 85, valve 6', and conduit 86. On the other hand if the pressure at point 58 is less than such predetermined value, the pilot valve 11, and hence valve 7, will move closer to seated position for less bypass flow to tank 40.

However, if the lever 71 is released the chambers 75 and 54 will be vented through conduits 87–88 and 89 and port 76 whereby spring 15 of valve 6' will open pilot valve 11 and spring 59 will close pilot valve 60 thus to bypass the pump output to tank 40 through valve 6' and to close valve 57' to prevent fuel delivery to nozzle 43.

When the valve 74 is actuated by jet pressure in receiver 48 acting on actuator 81 (level L below jet nozzle 63), the chamber 19 will be vented through conduit 87 and port 82 whereby the pilot valve 11 will open by spring pressure and by fuel pressure in chamber 75. Thus, the valve 7 opens for bypass of the pump output to the tank 40. Of course, when the fuel delivery nozzle 43 is closed, the pressure in the sensing conduit 52 will increase to open the pilot valve 11 despite air pressure on the other side of the plunger 16 thereof to open the valve 6'. When the three-way deadman valve 70 is released, the venting of the chamber 54 permits the spring 59 to move the pilot valve 60 toward seated position, whereby the main valve 62 moves toward closed position and, of course, the chamber 19 in the bypass pilot valve 11 is also vented so that the force of spring 15 may open said pilot valve 11 to permit opening of the main valve 7 for bypass as aforesaid.

Other modes of applying the principle of the invention may be employed, change being made as regards the details described, provided the features stated in any of the following claims, or the equivalent of such, be employed.

I therefore particularly point out and distinctly claim as my invention:

1. A fluid system comprising a tank; a pump having an intake port in communication with liquid in said tank and a discharge port for discharge of liquid under pressure through a delivery conduit connected at one end to said discharge port; valve means operative in response to variation in liquid pressure adjacent the downstream end of said delivery conduit to vary the rate of flow through said delivery conduit; and pump anti-cavitation means operative in response to decrease of the level of the liquid to a predetermined minimum level to conduct liquid pressure adjacent the upstream end of said delivery conduit to operate said valve means substantially to discontinue the flow of liquid from the downstream end of said delivery conduit.

2. The system of claim 1 wherein said valve means is of the demand type having a pressure actuated valve member in said delivery conduit.

3. The system of claim 1 wherein said valve means is of the bypass type having a pressure actuated valve member disposed to variably open and close a bypass conduit leading from said delivery conduit to said tank above the level of the liquid therein.

4. The system of claim 1 wherein another pressure source to said valve means conditions the latter for operation as aforesaid; and wherein the liquid pressure conducted from the upstream end of said delivery conduit is operative to vent said another pressure source at said valve means thus to enable operation of said valve means substantially to discontinue the flow of liquid from the downstream end of said delivery conduit.

5. The system of claim 1 wherein said pump anti-cavitation means comprises a jet level sensor disposed at such predetermined level to conduct liquid pressure as aforesaid when the unsubmerged jet stream from the jet nozzle thereof impinges on the jet receiver thereof.

6. The system of claim 5 wherein said valve means is of the demand type having a pressure actuated valve member in said delivery conduit.

7. The system of claim 5 wherein said valve means is of the bypass type having a pressure actuated valve member disposed to variably open and close a bypass conduit leading from said delivery conduit to said tank above the level of the liquid therein.

8. The system of claim 5 wherein another pressure source to said valve means conditions the latter for operation as aforesaid; and wherein the liquid pressure conducted by said jet level sensor from the upstream end of said delivery conduit is operative to vent said another pressure source at said valve means thus to enable operation of said valve means substantially to discontinue the flow of liquid from the downstream end of said delivery conduit.

References Cited

UNITED STATES PATENTS 3,020,924   2/1962   Davies _____ 137—386
3,172,420   3/1965   Brown et al. _____ 137—219

WILLIAM F. O'DEA, *Primary Examiner.*

D. R. MATTHEWS, *Assistant Examiner.*